United States Patent
Eitzmann et al.

(10) Patent No.: US 10,370,146 B2
(45) Date of Patent: Aug. 6, 2019

(54) FLUID-HOLDING CONTAINER FOR VEHICLE SERVICE CENTERS

(71) Applicant: SNYDER INDUSTRIES, INC., Lincoln, NE (US)

(72) Inventors: Nick Eitzmann, Lincoln, NE (US); Darrell Oltman, Lincoln, NE (US)

(73) Assignee: Snyder Industries, LLC, Lincoln, NE (US)

( * ) Notice: Subject to any disclaimer, the term of this patent is extended or adjusted under 35 U.S.C. 154(b) by 469 days.

(21) Appl. No.: 15/150,100

(22) Filed: May 9, 2016

(65) Prior Publication Data

US 2017/0225829 A1 Aug. 10, 2017

Related U.S. Application Data

(60) Provisional application No. 62/292,932, filed on Feb. 9, 2016, provisional application No. 62/238,194, filed on Oct. 7, 2015.

(51) Int. Cl.
| | |
|---|---|
| *B25H 1/00* | (2006.01) |
| *B65D 21/02* | (2006.01) |
| *F16N 31/00* | (2006.01) |
| *B65D 25/22* | (2006.01) |
| *B65D 1/40* | (2006.01) |

(52) U.S. Cl.
CPC ............ *B65D 21/0209* (2013.01); *B25H 1/00* (2013.01); *B65D 1/40* (2013.01); *B65D 25/22* (2013.01); *F16N 31/004* (2013.01)

(58) Field of Classification Search
CPC ...... B65D 21/0209; B65D 1/40; B65D 25/22; B29H 1/00; F16N 31/004
See application file for complete search history.

(56) References Cited

U.S. PATENT DOCUMENTS

| | | | | |
|---|---|---|---|---|
| 3,443,710 A | * | 5/1969 | Hills | B65D 1/0223 |
| | | | | 215/385 |
| 4,881,650 A | * | 11/1989 | Bartz | F16N 31/004 |
| | | | | 220/573 |
| D341,314 S | * | 11/1993 | Charbonneau | D9/520 |
| 2008/0245793 A1 | * | 10/2008 | Hanson | A45C 11/20 |
| | | | | 220/263 |

* cited by examiner

*Primary Examiner* — Steven A. Reynolds
*Assistant Examiner* — Javier A Pagan
(74) *Attorney, Agent, or Firm* — Hovey Williams LLP (57) ABSTRACT

A container for holding and dispensing fluids used in vehicles includes spaced-apart front and back walls; spaced-apart left and right side walls; and spaced-apart top and bottom walls; the front and back walls, left and right side walls, and top and bottom walls together defining an enclosed fluid-containing inner chamber. Two sets of through walls are molded between the front wall and the back wall of the container to define a pair of aligned, circular-shaped, horizontally-extending through-holes between the front wall and the back wall of the container.

14 Claims, 10 Drawing Sheets

FLUID-HOLDING CONTAINER FOR VEHICLE SERVICE CENTERS

RELATED APPLICATIONS

The present application is a non-provisional patent application and claims priority benefit, with regard to all common subject matter, of earlier-filed U.S. provisional patent application titled "FLUID CONTAINER FOR VEHICLE SERVICE CENTERS", Ser. No. 62/292,932, filed on Feb. 9, 2016, and U.S. provisional patent titled "FLUID CONTAINER FOR VEHICLE SERVICE CENTERS", Ser. No. 62/238,194, filed on Oct. 7, 2015, both of which are incorporated by reference in their entireties into the present application.

BACKGROUND

Fluid-holding containers are often used in vehicle service centers to store and dispense motor oils, transmission fluids, cleaning fluids, gasoline, and other fluids commonly used in or on motor vehicles. Unfortunately, such containers are typically large and bulky and therefore take up too much space, especially for vehicle service centers, which are often small, require multiple containers for multiple different types of vehicle fluids, and are often already crowded with vehicles, service equipment, vehicle parts, etc. Compounding this problem, many conventional fluid holding containers cannot be safely stacked to lessen their floor space requirements because the weight of their contained fluids places too much stress on the lowermost containers, occasionally causing them to buckle and even break. Some fluid-holding containers are designed to be stacked, but doing so can be dangerous, because the stacked containers may tip over when bumped by people or vehicles.

SUMMARY

The present invention solves the above-described problems and provides a distinct advance in the art of fluid-holding containers. More particularly, the present invention provides a fluid-holding container that takes up less floor space, is designed to be stacked without buckling, and can be quickly and safely secured against tipping when stacked.

An embodiment of the fluid-holding container is specifically designed for storing and dispensing vehicle lubricants, motor oils, gasoline, cleaning fluids, and other fluids used in or on motor vehicles and is sized and designed for use in vehicle service centers or other places with limited available floor space. The container is preferably rotationally molded from plastics or other synthetic resin materials, but it may also be formed with other molding techniques and/or from other materials.

An embodiment of the container is in the shape of a rectangular cube with a width that is at least twice its depth and a height that is about twice its depth. This shape allows the container to be placed along walls, on shelves, and in other tight spaces of a vehicle service center without occupying too much floor space.

The container includes an integrally molded through-hole or kiss-through that provides structural rigidity to the container by bridging its front and back walls so that several of the containers may be stacked without the containers bulging or swelling from the cumulative weight of the contained liquids. This, along with the shape and size of the containers, permits them to occupy less floor space.

In one embodiment, the through-hole is oval in shape with flared front and back openings and has a width 1-4 times its height. Relative to the overall dimensions of the container, the through-hole is ⅛-¼ as wide as the container and ¼ as tall as the container. Applicant has discovered that a through-hole of this shape and relative size provides an optimal balance between structural rigidity and the fluid-holding capacity of the container.

Another embodiment of the container includes two smaller, circular-shaped through-holes. These through-holes provide structural rigidity to the container and also provide structure for quickly and easily securing the container against a wall, column, or other support so that multiple containers can be safely stacked without risk of tipping over. Each through-hole has an inwardly extending ledge or other projection that defines a reduced-diameter passageway that divides the through-hole into a front portion and a rear portion. The front portion flares outwardly from the ledge toward the front wall of the container, and the rear portion flares outwardly from the ledge toward the rear wall of the container.

The ledge and the shape of the through-hole facilitate securement of the container against a wall or other support. Specifically, mounting hardware including a relatively larger first washer, a relatively smaller second washer, and a bolt or other fastener may be inserted in the front portion of the through-hole and urged against the ledge to secure the container. The first washer is first inserted into the front portion of one of the through-holes and placed against the front of its ledge, the second washer is then placed over the first washer, and then the bolt or other fastener inserted through the holes in the first and second washers and screwed or otherwise driven into the wall or other support. These steps are then repeated with a fastener and washers in the other through-hole of the container.

The through-holes and mounting hardware not only secure the container from tipping, but also permit the container to compress and expand vertically without pulling the fasteners from the wall or other support. Specifically, in one embodiment, the outside diameter of the first washer is greater than the diameter of the passageway defined by the ledge, and the outside diameter of the second smaller washer is greater than the hole in the first larger washer. This permits both washers to be firmly pressed against the ledge in the through-hole by the fastener to securely hold the container against the wall or other support. The inside diameter of the hole in the larger washer is greater than the outside diameter of the shaft of the fastener so that the larger washer and the fastener may move vertically relative to one another. This allows the container and the first washer to move up and down slightly relative to the fastener to accommodate vertical movement of the container when it bulges or otherwise expands when filled with fluids and/or contracts when drained. This reduces the likelihood of the container pulling the fastener from the wall when it is filled with liquids and/or when multiple containers are stacked on top of one another.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
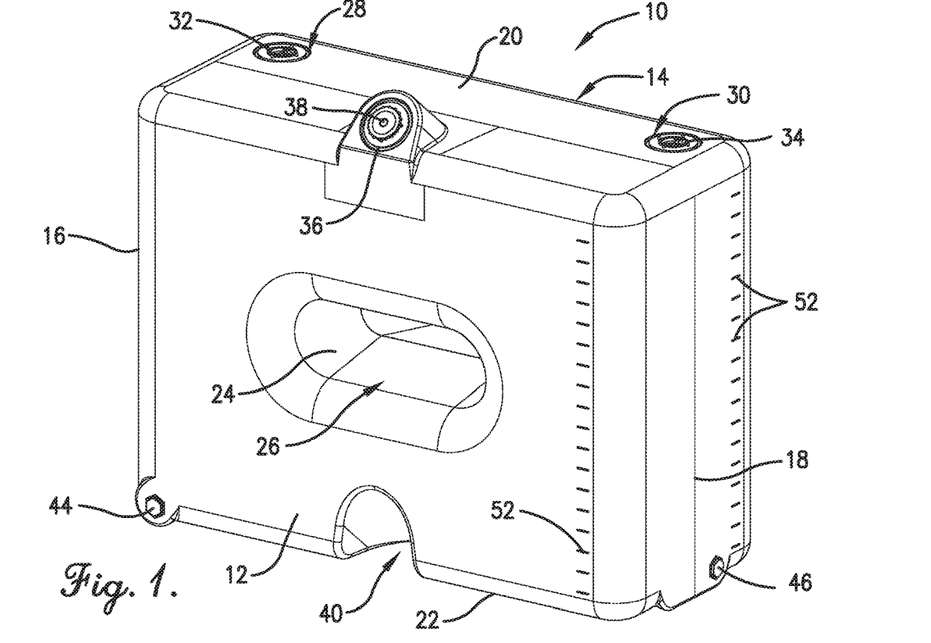
FIG. 1 is a perspective view of a fluid-holding container constructed in accordance with an embodiment of the present invention.
Figure 2:
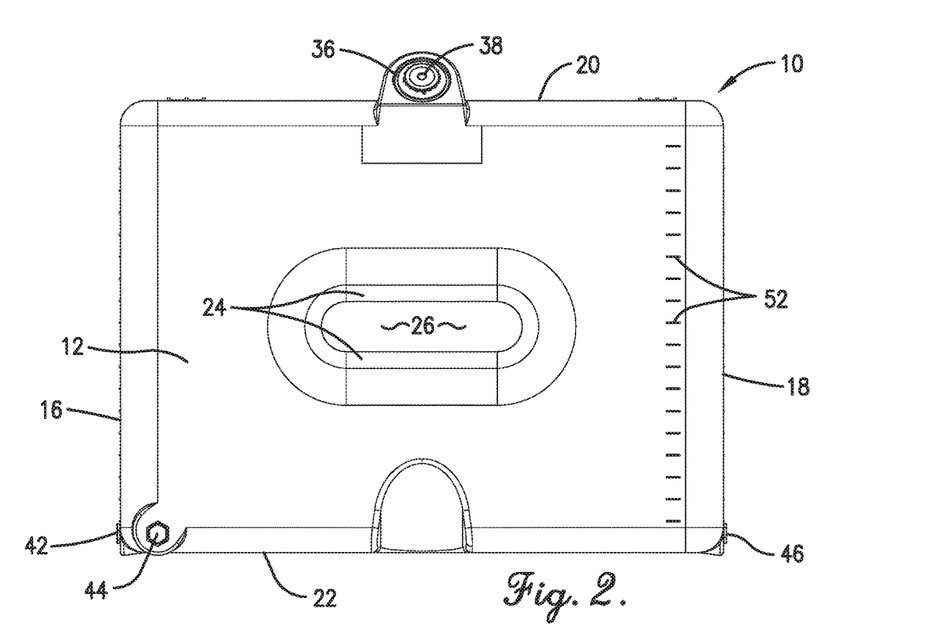
FIG. 2 is a front elevational view of the container.

Turning now to the drawing figures, and initially FIG. 1, a fluid-holding container 10 constructed in accordance with an embodiment of the invention is illustrated. The container 10 is designed for storing and dispensing vehicle lubricants, motor oils, gasoline, cleaning fluids, and other fluids or products commonly used in or on motor vehicles and is sized and designed for use in vehicle service centers or other applications with limited available floor space. An embodiment of the container 10 is rotationally molded from plastics or other synthetic resin materials, but it may also be formed with other molding techniques and/or from other materials.

The container 10 includes spaced-apart front and back walls 12, 14; spaced-apart left and right side walls 16, 18; and spaced-apart top and bottom walls 20, 22 that together define an enclosed fluid-containing inner chamber. The intersection of the walls 12, 14, 16, 18, 20, and 22 may be curved to form radiused edges and corners on the container.

An embodiment of the container 10 is in the shape of a rectangular cube with a width that is at least twice its depth and a height that is about twice its depth. This shape allows the container 10 to be placed along walls, on shelves, and in other tight spaces without occupying too much floor space. In one particular embodiment, the container 10 is 48 inches wide, 20 inches deep, and 36 inches tall; however, the principles of the present invention are not limited to containers of any particular shape or size.

Figure 4:
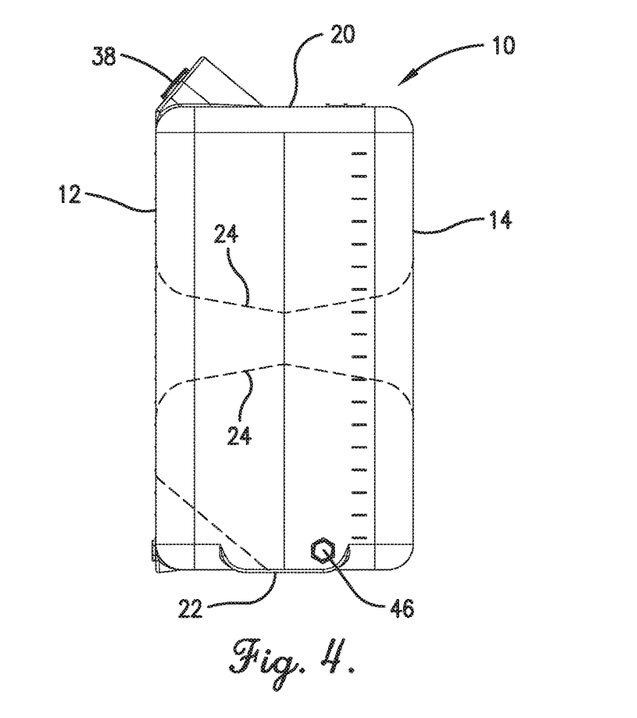
FIG. 4 is a side view of the container with the internal through walls that define a through-hole shown in dashed lines.

The container 10 also includes through walls 24 molded between the front wall 12 and the back wall 14 that define a central through-hole 26 extending horizontally between the front wall 12 and the back wall 14. The integrally molded through-hole 26 provides structural rigidity to the container by bridging the front and back walls 12, 14 so that the container doesn't bulge excessively when filled with fluids and/or when stacked with other containers. This, along with the shape and size of the containers permits it to occupy less floor space.

In one embodiment, the through-hole 26 is oval in shape and has flared front and rear opening and a width 1-4 times its height. An embodiment of the through-hole 26 is ⅛-¼ as wide as the container and approximately ¼ the height of the container. A particular embodiment of the through-hole 26 is approximately 10" wide and 3" tall as measured from the center of the container and approximately 14" wide and 5" tall as measured from the outer periphery of its flared openings.

Figure 3:
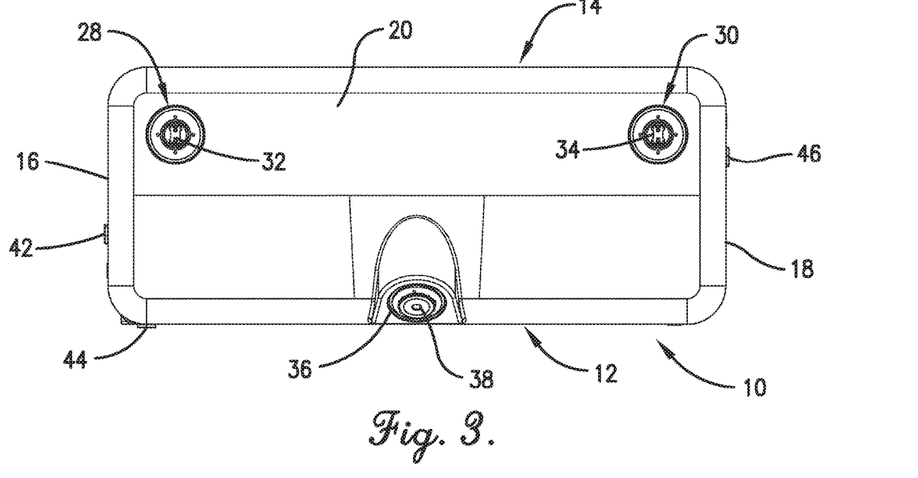
FIG. 3 is a top view of the container.

As best shown in FIGS. 1 and 3, an embodiment of the container 10 also has two top fill openings 28, 30 in its top wall 20. The top fill openings 28, 30 are preferably 2" in diameter and are flush-mounted in the top wall and include molded-in, internally threaded metal sockets for receiving externally threaded caps or plugs 32, 34. The container also includes a front fill opening 36 that is angled relative to the top wall and front wall. The front fill opening 36 is also preferably 2" in diameter and includes a molded-in, internally threaded metal socket for receiving an externally threaded cap 38. A recess 40 is formed in the intersection of the bottom wall 22 and the front wall 12 of the container to provide access to the front fill opening 36 of another container placed beneath it to facilitate filling of the containers when they are stacked as shown in FIG. 6.

Figure 10:
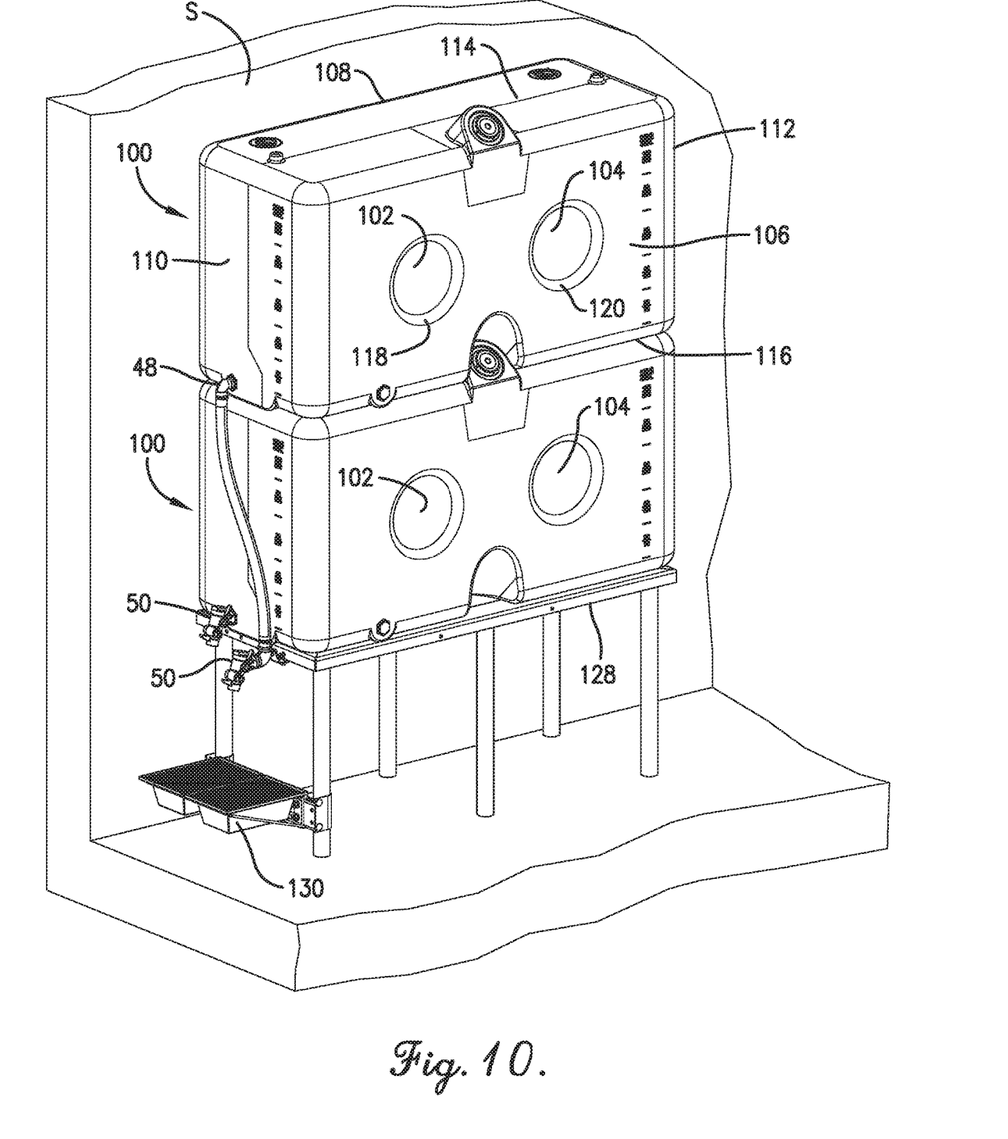
FIG. 10 is a perspective view of two fluid-holding containers constructed in accordance with another embodiment of the present invention shown supported on a stand with an attached drip-tray.
Figure 11:
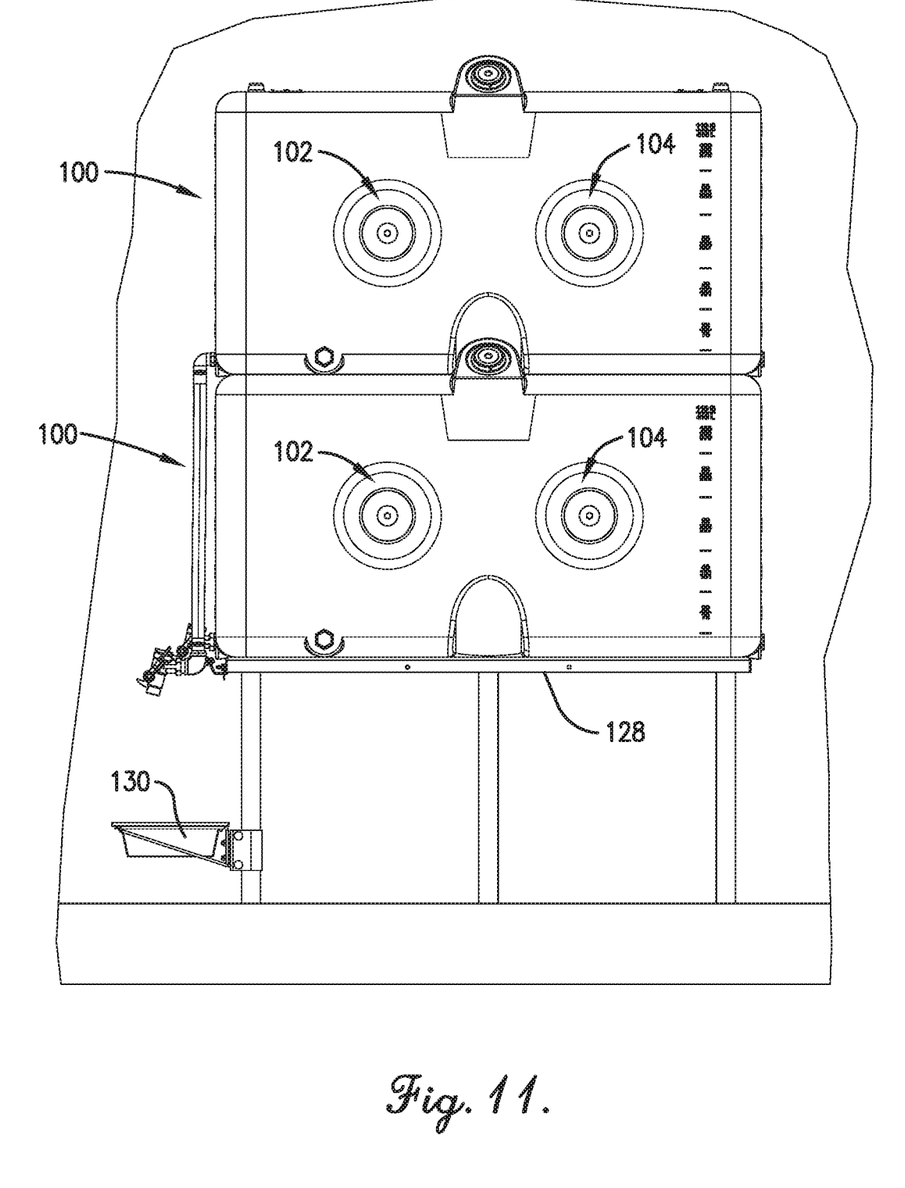
FIG. 11 is a front elevational view of the containers and stand of FIG. 10.

The container 10 also includes three bottom drains 42, 44, 46 to permit dispensing of fluids from any side of the container. The drains 42, 44, 46 are preferably 1" in diameter and also include molded-in, internally threaded metal sockets for receiving externally threaded drain plugs, hoses 48, and/or valves 50 as shown in FIG. 10.

Volume markings 52 in gallons or some other unit may be molded in the front wall 12 and right side wall 18 of the container. Other markings may also be molded in or printed on the container.

Figure 5:
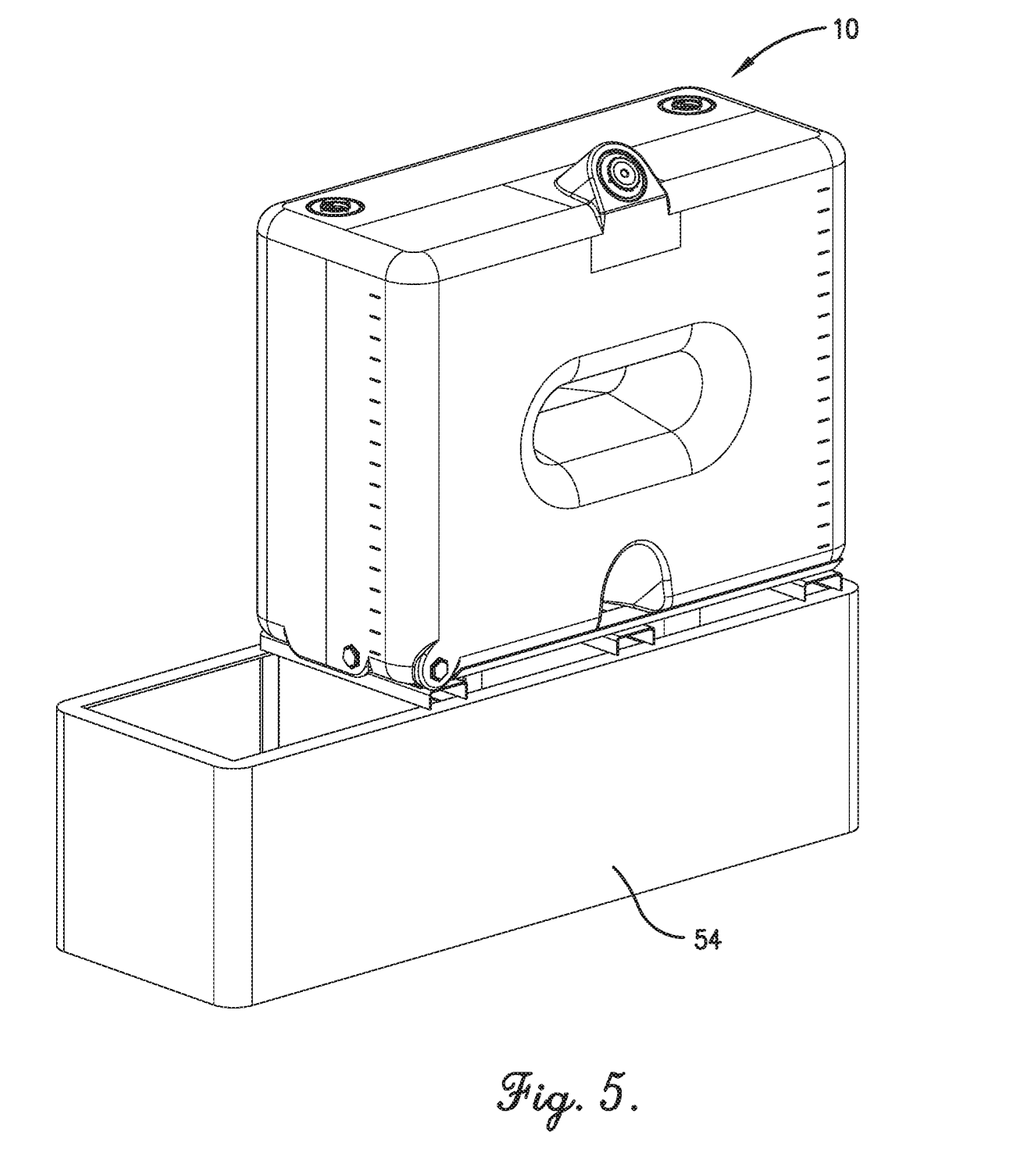
FIG. 5 is a perspective view of the container shown supported on a fluid-containing stand.
Figure 6:
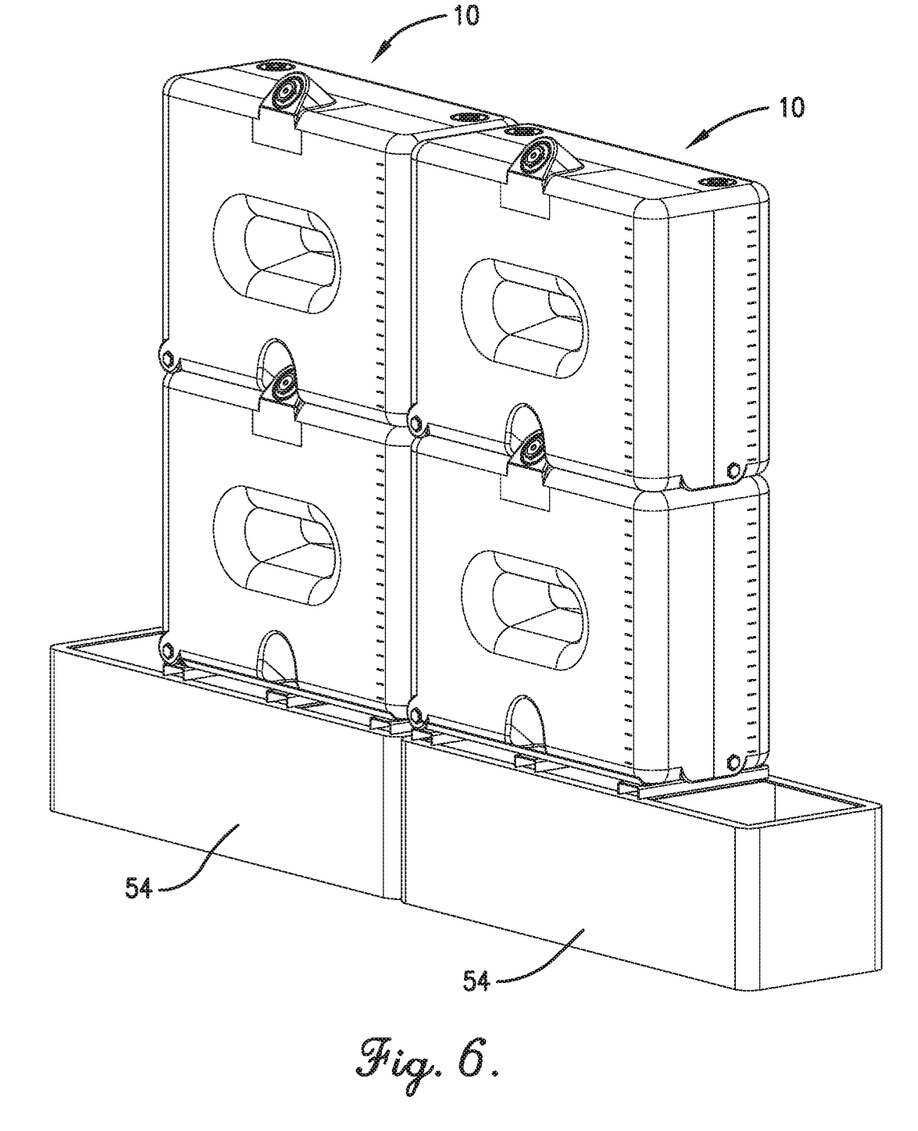
FIG. 6 is a perspective view of several of the containers shown supported on a pair of fluid-containing stands.
Figure 7:
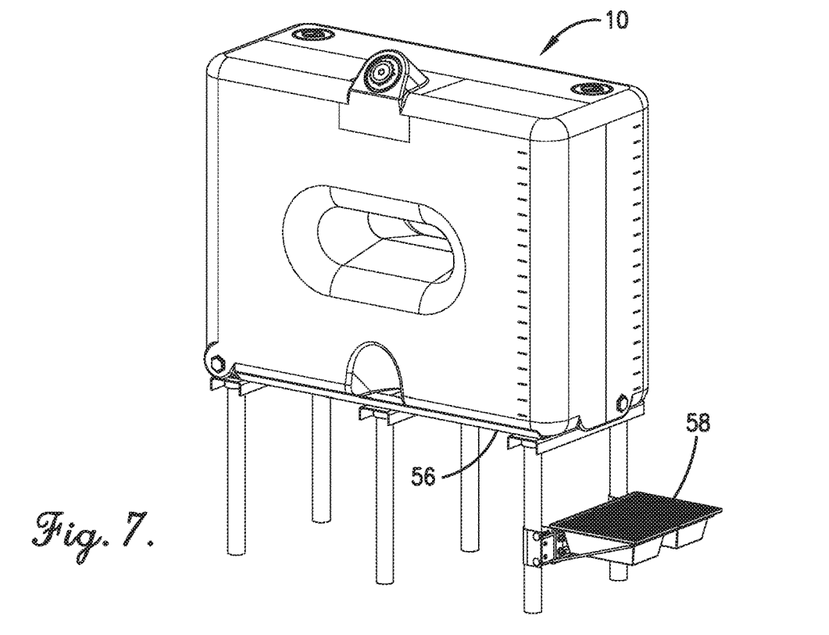
FIG. 7 is a perspective view of the container shown supported on a stand with an attached drip-tray.
Figure 8:
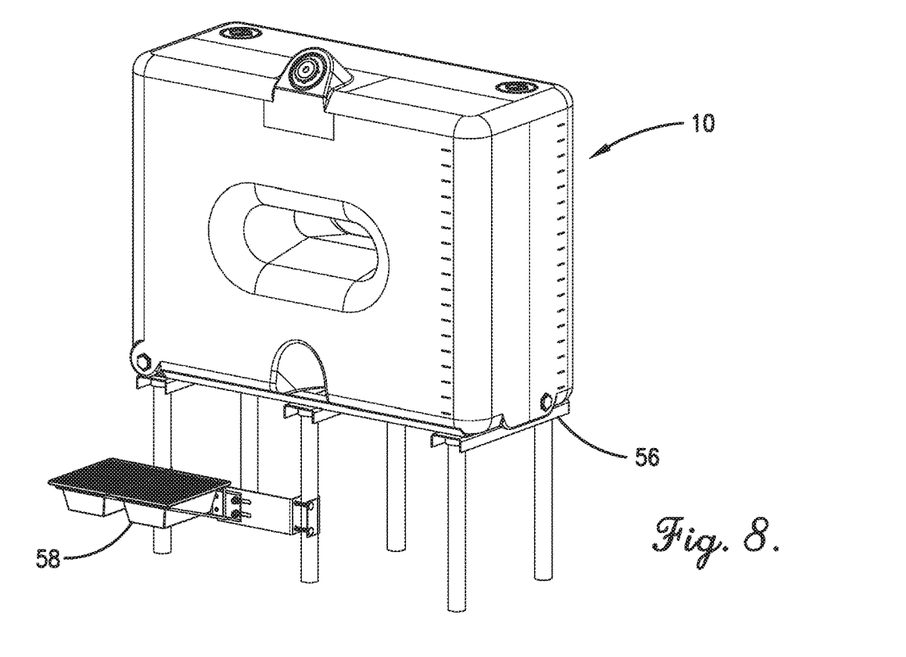
FIG. 8 is a perspective view of the container shown supported on a stand with a drip-tray attached to a different portion of the stand.
Figure 9:
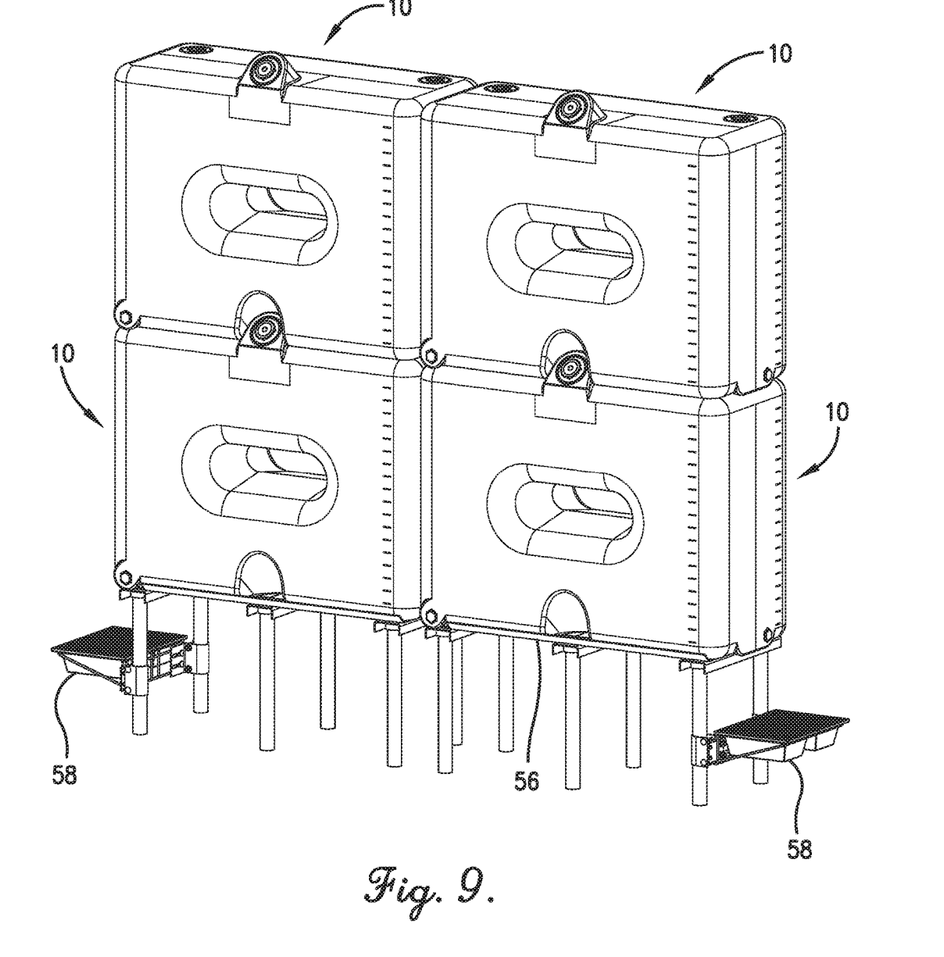
FIG. 9 is a perspective view of several of the containers shown supported on a pair of stands with several attached drip-trays.

As best shown in FIGS. 5 and 6, one or more of the containers 10 may be placed on one or more containment type stands 54 to catch any fluids that drip or otherwise leak from the containers. One or more of the containers 10 may also be supported on elevated type stands 56 as shown in FIGS. 7, 8, and 9. One or more drip trays 58 may be attached to the legs of the stands. Advantageously, the drip trays 58 and hoses 48 and valves 50 may be placed on the short or long side of the container to facilitate dispensing liquids from multiple sides of the container.

FIGS. 10-13 depict a container 100 constructed in accordance with another embodiment of the invention. The container is similar to the container 10 described above except that it is larger and includes two circular-shaped through-holes or kiss-throughs 102, 104. The container also includes spaced-apart front and back walls 106, 108; spaced-apart left and right side walls 110, 112; and spaced-apart top and bottom walls 114, 116 that together define an enclosed fluid-containing inner chamber.

Figure 12:
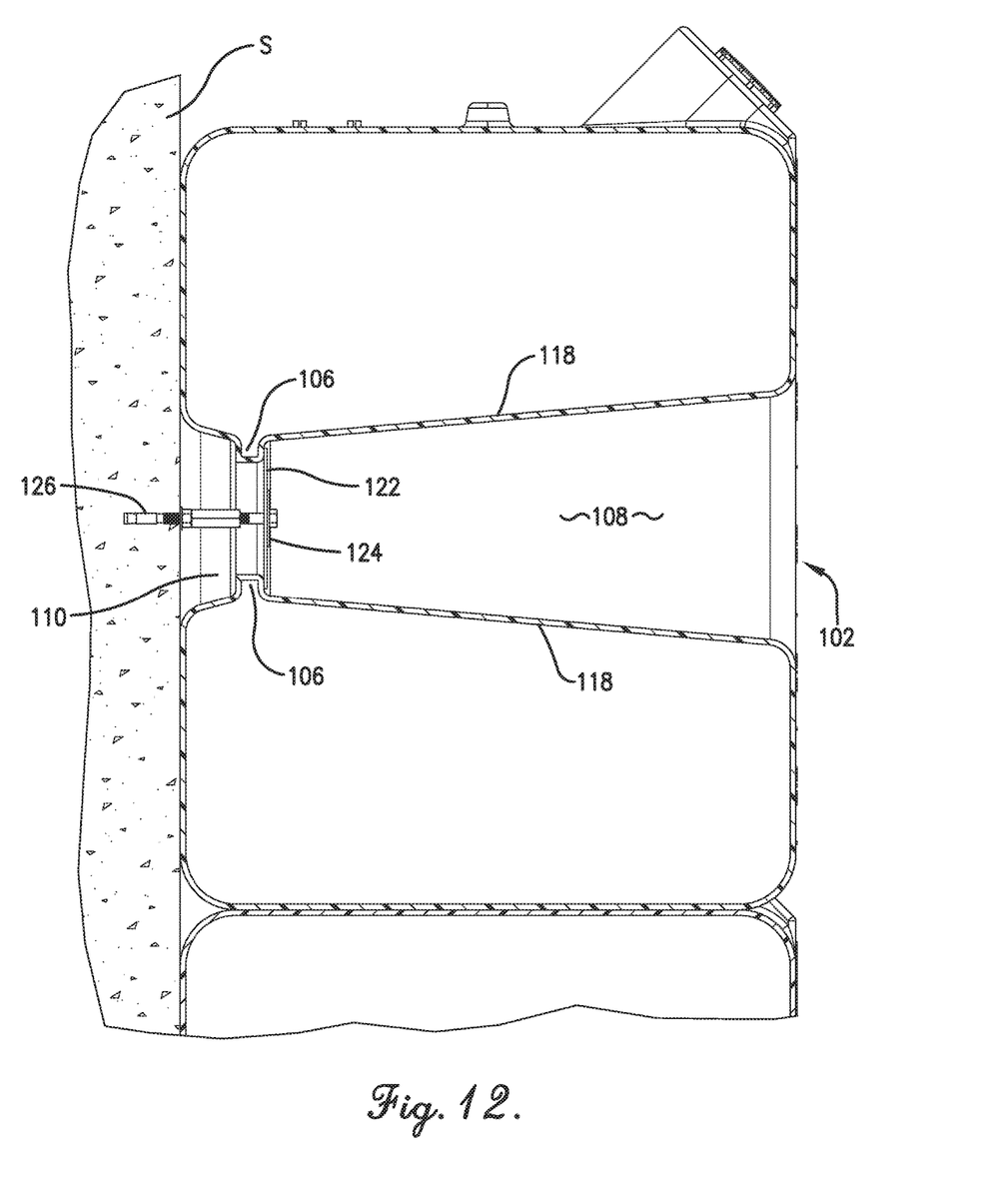
FIG. 12 is a partial vertical sectional view of the containers of FIG. 10.

Through walls 118,120 are molded between the front wall 106 and the back wall 108 to define the through-holes 102, 104. As with the first embodiment of the invention, these through-holes 102, 104 provide structural rigidity to the container by bridging the front and back walls of the container so that multiple containers may be stacked.

Figure 13:
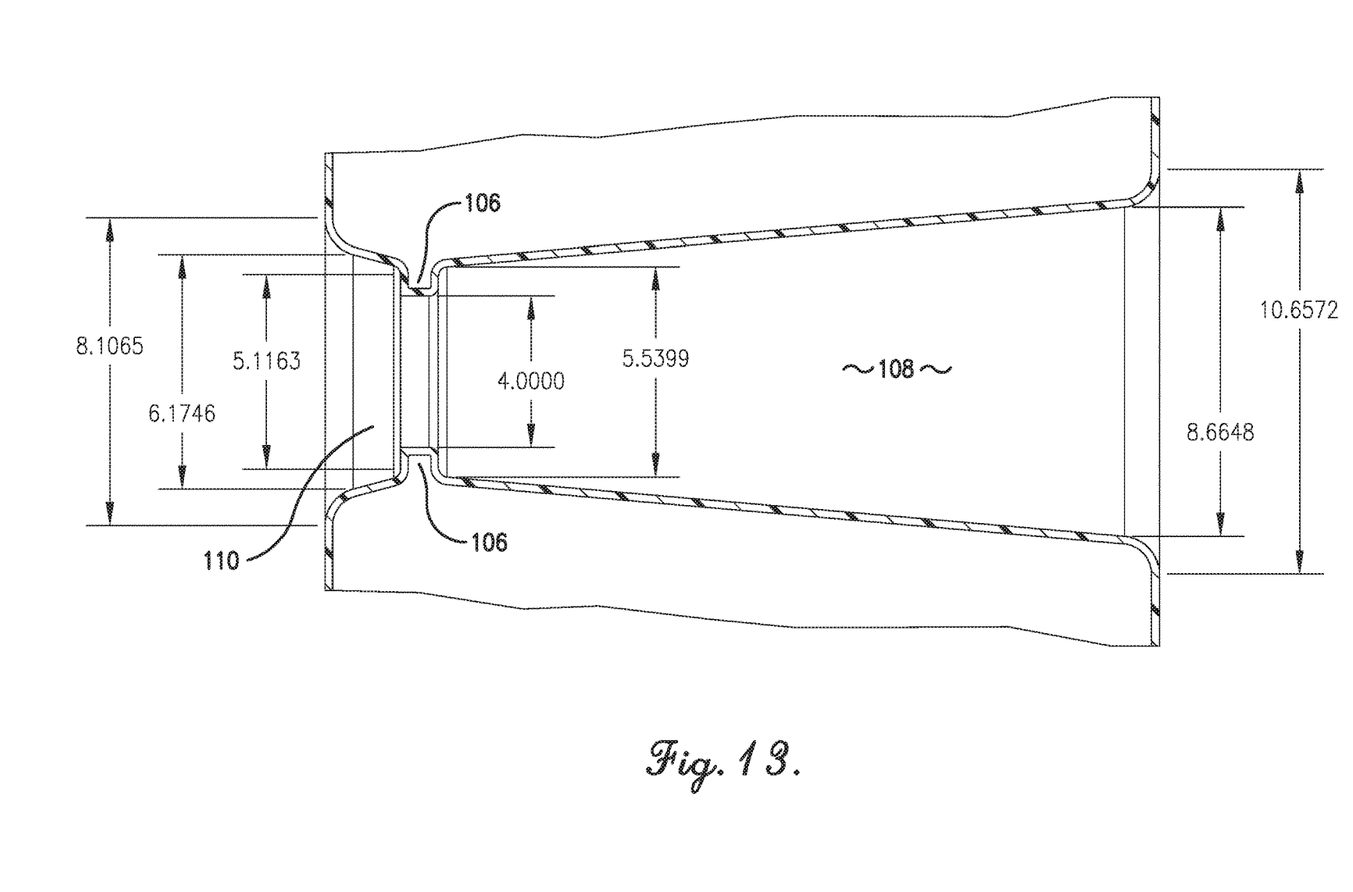
FIG. 13 is a partial vertical sectional view of one of the containers of FIG. 10 with dimensions of certain parts of the container.

The through-holes 102, 104 also include structure for mounting or otherwise supporting the container 100 against a wall, column, or other support. FIG. 12 shows one of the through-holes 102 in more detail. The through-hole 102 has an inwardly extending ledge 106 or other projection that creates a reduced diameter passageway that divides the kiss-through into a front portion 108 and a rear portion 110. The front portion 108 flares outwardly from the ledge 106 toward the front wall of the container, and the rear portion 110 flares outwardly from the ledge 106 toward the rear wall of the container. FIG. 13 depicts specific dimensions (all in inches) of an embodiment of the kiss-through 102 at several points. The through-hole 104 is not shown in detail in FIGS. 12 and 13 but is identical to the through-hole 102.

The through-holes 102, 104 are configured to receive mounting hardware to secure the container 100 against the wall or support S. An embodiment of the mounting hardware includes a relatively larger first washer 122; a relatively smaller second washer 124; and a bolt, screw, nail, or other fastener 126. The first washer 122 is first inserted into the front portion 108 of the kiss-through 102 and placed against the front of the ledge 106, the second washer 124 is then placed over the first washer, and the fastener 126 is then inserted through the holes in the first and second washers and screwed or otherwise driven into the wall or other support S. These steps may then be repeated with a fastener and washers in the second kiss-through 104.

The through-holes and mounting hardware cooperatively permit the container to compress and expand vertically without pulling the fasteners from the wall or other support. The outside diameter of the first washer 122 is greater than the diameter of the passageway defined by the ledge 106, and the outside diameter of the second smaller washer 124 is greater than the hole in the first larger washer 122. This permits both washers 122, 124 to be firmly pressed against the ledge 106 by the fastener 126 to securely hold the container against the wall or other support.

The inside diameter of the hole in the larger washer 122 is greater than the outside diameter of the shaft of the fastener 126 so that the larger washer 122 and the fastener 126 may move vertically relative to one another. This allows the container 100 and the first washer to move up and down slightly relative to the fastener 126 to accommodate vertical movement of the container when it bulges or otherwise expands when filled with fluids and/or contracts when drained. This reduces the likelihood of the container pulling the fastener 126 from the wall when it is filled with liquids. This can also be accomplished without the second washer 124 if the head of the fastener 126 is larger than the hole in the first washer 122; but two washers are preferred because they more easily slide up and down relative to one another.

As with the container 10, one or more of the containers 100 may be placed on one or more stands 128 to catch any fluids that drip or otherwise leak from the containers. One or more drip trays 130 may be attached to the legs of the stands.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A container for holding and dispensing fluids used in vehicles, the container comprising:
   spaced-apart front and back walls;
   spaced-apart left and right side walls;
   spaced-apart top and bottom walls,
   the front and back walls, left and right side walls, and top and bottom walls together defining an enclosed fluid-containing inner chamber;
   a top fill opening in the top wall for introducing fluids into the inner chamber: and
   through walls molded between the front wall and the back wall that define a central, horizontally-extending through-hole between the front wall and the back wall, the through-hole being ⅛-¼ as wide as the container and approximately ¼ as tall as the container, the through-hole having a height in a direction extending between the top wall and the bottom wall and a width in a direction extending between the left side wall and the right side wall, the width being greater than the height;
   the through-hole centered between the left side wall and the right side wall and centered between the top wall and the bottom wall.

2. The container as set forth in claim 1, wherein the through-hole is oval-shaped and has outwardly-flared front and rear openings.

3. The container as set forth in claim 1, wherein the container is at least twice as wide as it is deep.

4. The container as set forth in claim 1, wherein the container is approximately twice as high as it is deep.

5. The container as set forth in claim 1, further comprising a second top fill opening in the top wall for introducing fluids into the inner chamber of the container.

6. The container as set forth in claim 1, further comprising a front fill opening along the front wall for introducing fluids into the inner chamber of the container, wherein the front fill opening is angled with respect to the front wall.

7. The container of claim 6, further comprising a lower recess configured to receive a protrusion of a front fill opening of another container when the container is stacked on the other container.

8. The container of claim 7, wherein the front fill opening of the container and the lower recess are centered between the left side wall and the right side wall.

9. The container as set forth in claim 1, further comprising positioned along the bottom wall for dispensing fluids from the container.

10. The container as set forth in claim 1, wherein the height of the through-hole is smallest near a midpoint between the front wall and the back wall.

11. The container as set forth in claim 1, wherein the width of the through-hole is smallest near a midpoint between the front wall and the back wall.

12. The container as set forth in claim 1, wherein the through-hole is symmetric between the front wall and the back wall.

13. A container for holding and dispensing fluids used in vehicles, the container comprising:
- spaced-apart front and back walls;
- spaced-apart left and right side walls;
- spaced-apart top and bottom walls,
- the front and back walls, left and right side walls, and top and bottom walls together defining an enclosed fluid-containing inner chamber;
- a top fill opening in the top wall for introducing fluids into the inner chamber;
- a front fill opening along the front wall for introducing fluids into the inner chamber, the front fill opening being angled with respect to the front wall;
- a lower recess configured to receive a protrusion of a front fill opening of another container when the container is stacked on the other container; and
- through walls molded between the front wall and the back wall that define a central, horizontally-extending through-hole between the front wall and the back wall, the through-hole being $1/8$-$1/4$ as wide as the container and approximately $1/4$ as tall as the container, the through-hole having a height in a direction extending between the top wall and the bottom wall and a width in a direction extending between the left side wall and the right side wall, the width being greater than the height.

14. A container for holding and dispensing fluids used in vehicles, the container comprising:
- spaced-apart front and back walls;
- spaced-apart left and right side walls;
- spaced-apart top and bottom walls,
- the front and back walls, left and right side walls, and top and bottom walls together defining an enclosed fluid-containing inner chamber;
- a top fill opening in the top wall for introducing fluids into the inner chamber;
- plurality drain holes positioned along the bottom wall for dispensing fluids from the container; and
- through walls molded between the front wall and the back wall that define a central, horizontally-extending through-hole between the front wall and the back wall, the through-hole being $1/8$-$1/4$ as wide as the container and approximately $1/4$ as tall as the container, the through-hole having a height in a direction extending between the top wall and the bottom wall and a width in a direction extending between the left side wall and the right side wall, the width being greater than the height.

* * * * *